US00RE38478E

(19) United States
(12) Reissued Patent
Fitch, Jr. et al.

(10) Patent Number: US RE38,478 E
(45) Date of Reissued Patent: Mar. 30, 2004

(54) APPARATUS FOR DISPENSING A QUANTITY OF MATERIAL ON A SHELL

(75) Inventors: Clifford E. Fitch, Jr., 2664 E. Offner, Beecher, IL (US) 60401; James N. Egan, Mount Prospect, IL (US)

(73) Assignee: Clifford E. Fitch, Jr., South Holland, IL (US)

(21) Appl. No.: 10/092,514

(22) Filed: Mar. 7, 2002

Related U.S. Patent Documents

Reissue of:
(64) Patent No.: 6,032,610
Issued: Mar. 7, 2000
Appl. No.: 09/025,698
Filed: Feb. 18, 1998

(51) Int. Cl.[7] ..... A23G 3/00
(52) U.S. Cl. ..... 118/13; 118/16; 118/24; 118/314; 118/324; 426/289; 426/292; 99/450.1; 99/450.7; 99/494
(58) Field of Search ..... 118/13, 16, 24, 118/27, 314, 324, 686, 687; 426/289, 292; 99/450.1, 450.7, 494; 222/56; 366/342, 343, 326.1, 308

(56) References Cited

U.S. PATENT DOCUMENTS

| | | | | |
|---|---|---|---|---|
| 1,994,797 | A | 3/1935 | Thomas | 177/108 |
| 2,715,878 | A | 8/1955 | Egerton | 99/450.1 |
| 3,193,029 | A | 7/1965 | Harvison | 177/120 |
| 3,241,625 | A | 3/1966 | Soojian | 177/120 |
| 3,368,501 | A | 2/1968 | Kuhlman | 99/450.7 |
| 3,522,854 | A | 8/1970 | Verden | 177/119 |
| 3,525,374 | A | 8/1970 | Fitch | 241/84.4 |
| 3,633,450 | A | 1/1972 | Grote | 99/450.1 |
| 3,633,489 | A | 1/1972 | Spoelhof | 99/450.1 |
| 3,682,106 | A | 8/1972 | Kuhlman | 99/450.1 |
| 3,725,974 | A | 4/1973 | Kuhlman | 99/450.1 |
| 3,760,715 | A | 9/1973 | Grote | 99/450.1 |
| 3,779,205 | A | 12/1973 | Kuhlman | 118/24 |

(List continued on next page.)

OTHER PUBLICATIONS

Problem–Solving Ideas "On line weighing system slashes inventories, speeds processing" (Undated).*

Electronic scales measure up on filling, assembly lines (Undated).*

Computer feedback on line (Undated).*

Computerized scale system cuts give–away, waste (Undated).*

Computerized QC system streamlines weight checking (Undated).*

*Primary Examiner*—Laura Edwards
(74) *Attorney, Agent, or Firm*—Olson & Hierl, Ltd.

(57) ABSTRACT

A food material dispensing apparatus for adding a topping to a target food is described. The apparatus comprises a first hopper and a first food distributing system. The first hopper is adapted for receiving the food material at an inlet and delivering the good material through an outlet toward a target location. The first food distributing system is designed for spreading the food material over the target food. The food distributing system includes a motor positioned a horizontal distance from the inlet of the first hopper, a curved conduit, and a flexible, rotary shaft. The curved conduit has a proximal end and a distal end. The proximal end is releaseably connected to the motor, and the distal end is adapted for insertion into the hopper. The flexible, rotary shaft is for stirring and/or mixing the food material. The flexible, rotary shaft [passing] *passes* through the curved conduit and is operatively connected at a first end to the motor *and at a second end to a distributing blade. The apparatus can be operated to dispense food material either on sequential target foods that advance on a stop-and-go conveyor belt, or on virtually stationary transfer belts that then advance and deliver food material thereon to sequential target foods that are advancing on a continuously operating conveyor belt.*

24 Claims, 6 Drawing Sheets

U.S. PATENT DOCUMENTS

| | | | | |
|---|---|---|---|---|
| 3,780,643 | A | 12/1973 | Papai | 99/450.7 |
| 3,858,545 | A | 1/1975 | Fischer et al. | 118/13 |
| 3,908,584 | A | 9/1975 | Raque | 118/682 |
| 3,943,601 | A | 3/1976 | Kuhlman | 425/441 |
| 3,945,448 | A | 3/1976 | Sellers | 177/25.19 |
| 3,980,235 | A | 9/1976 | Kuhlman | 241/84 |
| 4,060,027 | A | 11/1977 | Jenny | 99/450.1 |
| 4,068,570 | A | 1/1978 | Lanoie | 99/353 |
| 4,112,834 | A | 9/1978 | Thiry | 99/450.1 |
| 4,145,990 | A | 3/1979 | Hochandel et al. | 118/680 |
| 4,152,976 | A | 5/1979 | Kawasaki et al. | 99/450.1 |
| 4,202,260 | A | 5/1980 | Weger | 99/450.4 |
| 4,225,001 | A | 9/1980 | Gillenkirch | 177/90 |
| 4,230,007 | A | 10/1980 | Grote et al. | 83/409.2 |
| 4,248,173 | A | 2/1981 | Kuhlman | 118/20 |
| 4,264,634 | A | 4/1981 | Hochandel et al. | 426/289 |
| 4,395,427 | A | 7/1983 | Fischer et al. | 426/231 |
| 4,438,686 | A | 3/1984 | Perez | 99/353 |
| 4,771,726 | A | 9/1988 | Fitch, Jr. | 118/25 |
| 4,778,365 | A | 10/1988 | Archer | 425/73 |
| 4,801,097 | A | 1/1989 | Fitch, Jr. | 241/34 |
| 4,832,961 | A | 5/1989 | Aoki | 425/239 |
| 4,839,185 | A | 6/1989 | Gram | 426/512 |
| 4,850,845 | A | 7/1989 | Hicks | 425/289 |
| 4,960,025 | A | 10/1990 | Fitch | 83/703 |
| 5,012,726 | A | 5/1991 | Fehr et al. | 99/450.6 |
| 5,043,391 | A | 8/1991 | Wreesmann et al. | 525/279 |
| 5,073,391 | A | 12/1991 | DeMars et al. | 426/231 |
| 5,121,677 | A | 6/1992 | LeClaire et al. | 99/357 |
| 5,171,367 | A | * 12/1992 | Fitch, Jr. | 118/25 |
| 5,458,055 | A | 10/1995 | Fitch, Jr. | 99/450.1 |
| 5,523,101 | A | 6/1996 | Fitch, Jr. | 426/289 |
| 5,678,476 | A | 10/1997 | Sanders | 99/450.1 |

* cited by examiner

FIG. 2
AMENDED
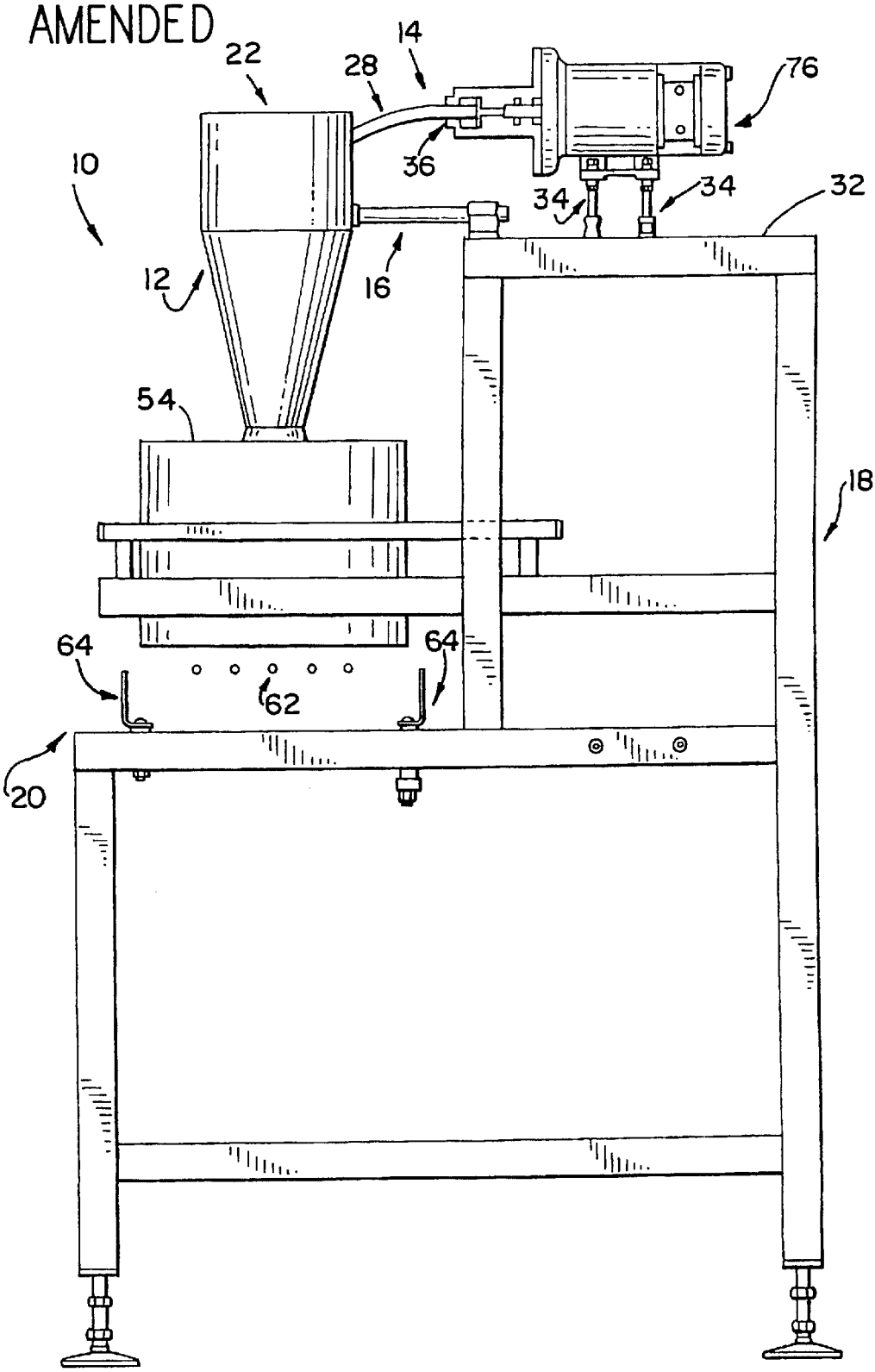

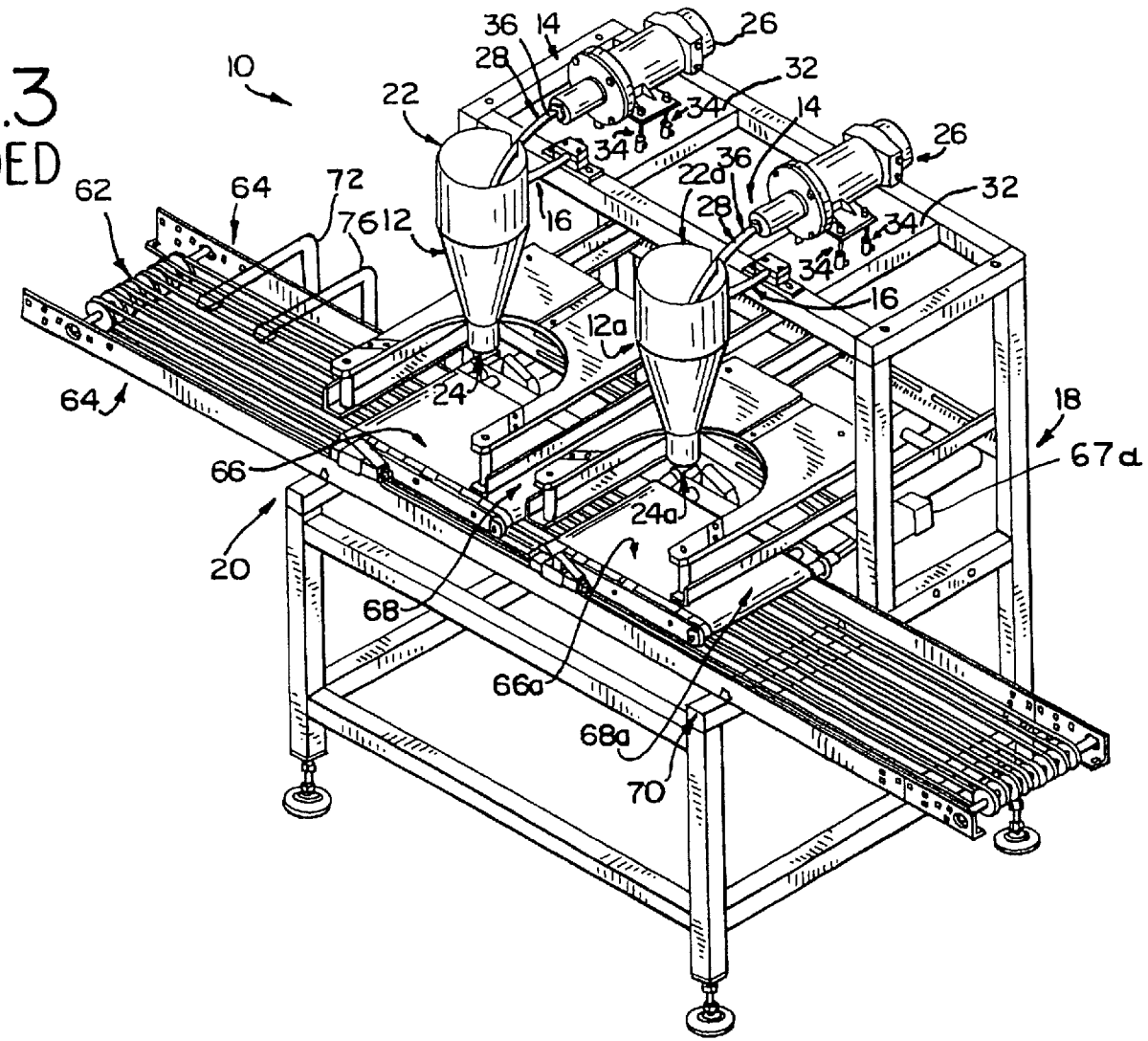
FIG.3
AMENDED

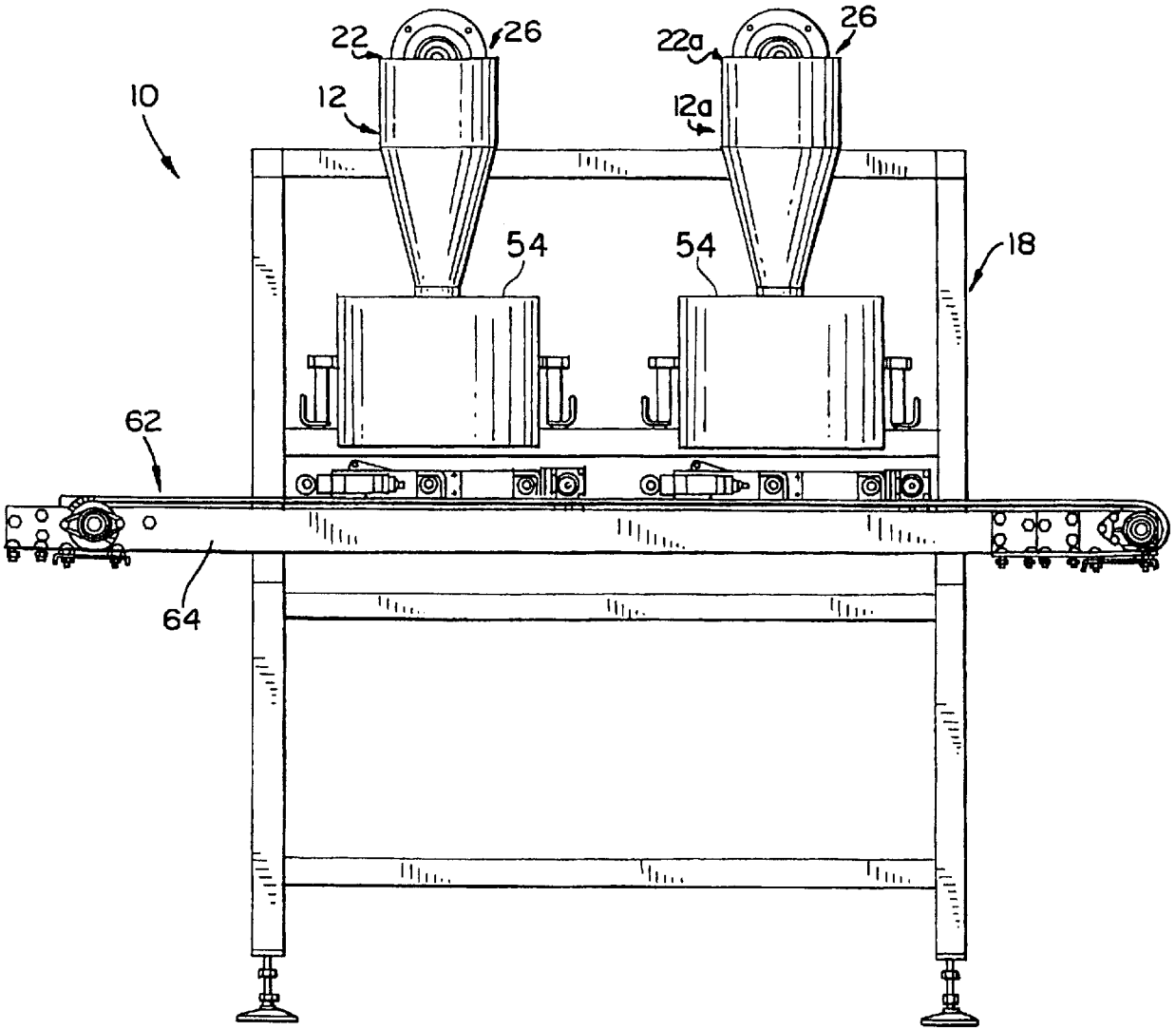
FIG. 4
AMENDED

FIG. 5
AMENDED
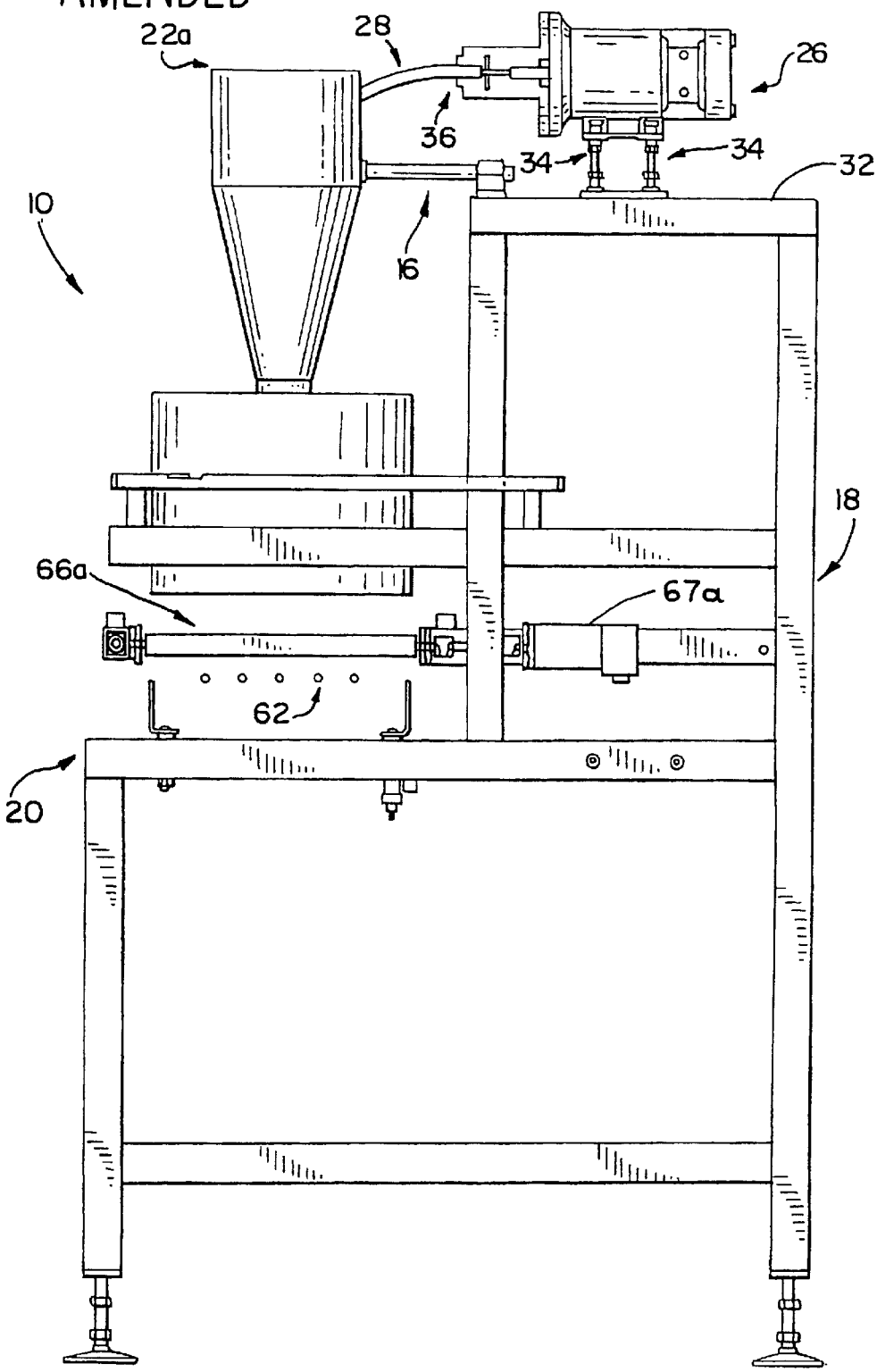

APPARATUS FOR DISPENSING A QUANTITY OF MATERIAL ON A SHELL

Matter enclosed in heavy brackets [ ] appears in the original patent but forms no part of this reissue specification; matter printed in italics indicates the additions made by reissue.

TECHNICAL FIELD

The present invention relates generally to automated dispensing devices, and, more particularly to an apparatus for applying cheese to individual pizza shells, such as at a high volume producer of frozen pizzas.

BACKGROUND

Pizza making is generally a labor intensive undertaking. Pizza crusts or shells are produced from a dough substance, seasoned tomato sauce is added and spread evenly over the shell, and other toppings such as cheese, meats, and vegetables are added according to personal taste. In many situations, it is advantageous to produce pizzas as fast as possible. This is the case in the manufacture of frozen pizzas.

It is simply not cost effective to manually produce individual frozen pizzas. In order for the manufacturer to achieve a suitable profit margin, frozen pizzas must be produced rapidly with as little human intervention as possible. Manufacturers have incorporated many different devices in the pizza making operation to automate certain tasks. Chief among these tasks is the addition of toppings. For instance, U.S. Pat. No. 3,525,374 described an automated pizza meat dispenser; U.S. Pat. No. 4,771,726 describes a an automated device for adding a flowable material, such as pizza sauce, to a food target; U.S. Pat. No. 4,801,097 describes a food ingredient dispensing device; U.S. Pat. No. 5,171,367 describes an apparatus for applying pizza sauce to a pizza; and, U.S.

Pat. No. 5,523,101 describes a multi-purpose applicator.

It is also important for the different automated dispensers to operate as efficiently and quickly as possible. Therefore, it is advantageous to design a dispenser which functions continuously or does not pause [to add] *during addition of* the toppings to the shell.

Furthermore, it is important to spread the toppings evenly over the shell. If the toppings are not spread evenly over the shell, the pizza will become unbalanced, and it will have an awkward appearance and perhaps cook unevenly. Therefore, an automated dispenser must spread the toppings uniformly over the shell.

Therefore, there is a need for a continuous apparatus for adding a food material to a shell for use in the pizza making industry described herein.

SUMMARY OF THE INVENTION

The present invention is directed toward a food material dispensing apparatus *and method* for adding a topping to a target food. The apparatus comprises *in one aspect* a first hopper and a first food material distributing system. The first hopper is adapted for receiving *a predetermined amount of* the food material at an inlet and delivering the food material through an outlet toward a target location. The inlet generally has a larger cross-sectional area than the outlet so that the hopper has a funnel-like structure for directing the food material toward a concentrated area.

The first food distributing system is for spreading *or distributing* the food material over [the] *a* target food. The food distributing system includes a motor, a curved conduit and a flexible, rotary shaft. The motor is positioned near the inlet of the hopper and at a horizontal distance from the hopper. A proximal end of the curved conduit is releaseably connected to the motor. The curved conduit is adapted to enter the interior of the hopper near the inlet [so that] *and to have* a distal end [of the curved conduit] *that* is positioned near the hopper's outlet.

The flexible, rotary shaft has a first end and a second end. The first end is operatively connected to the motor so that the motor transfers a rotary motion to the flexible, rotary shaft. The flexible, rotary shaft passes through the curved conduit so that the second end is positioned near the distal end of the curved conduit.

*In another aspect, the invention achieves an apparatus and a method for dispensing food material in an accurate and precise manner upon individual target foods that are sequentially arranged upon a continuously moving conveyor belt that does not stop. In this aspect, the food material is first dispensed upon a stationary transfer belt. The transfer belt is then advanced and synchronized with an individual target food on the conveyor belt. The individual target food becomes vertically aligned with the dispensed food material on the transfer belt and the dispensed food material is transferred progressively and gravitationally to the target food.*

Other features and advantages of the invention will be apparent from the following specification taken in conjunction with the following [drawing] *drawings*.

BRIEF DESCRIPTION OF THE DRAWINGS

FIG. 2 is a side *elevational* view of [an] *the* apparatus [for dispensing a quantity of material on a shell.] *embodiment of FIG. 1, the conveyor belt being shown in schematic vertical section, the mask member being in place, and some parts being removed;*

FIG. 3 is a perspective view of [an] *another emboeiment of* apparatus for dispensing a quantity of material [on] *upon* a shell *or like target food, the mask members and some other parts being removed*;

FIG. 4 is *a* front view of [an] *the* apparatus [for dispensing a quantity of material on a shell] *embodiment of FIG. 3, the conveyor belt being shown with opposite ends shortened, the mask members being in place, and some parts being removed*;

FIG. 5 is a side *elevational* view of [an] *the* apparatus [for dispensing a quantity of material on a shell] *embodiment of FIG. 3, the conveyor belt and one transfer belt each being shown in schematic vertical section, the mask members being in place, and some parts being removed*.

DETAILED DESCRIPTION

Figure 1:
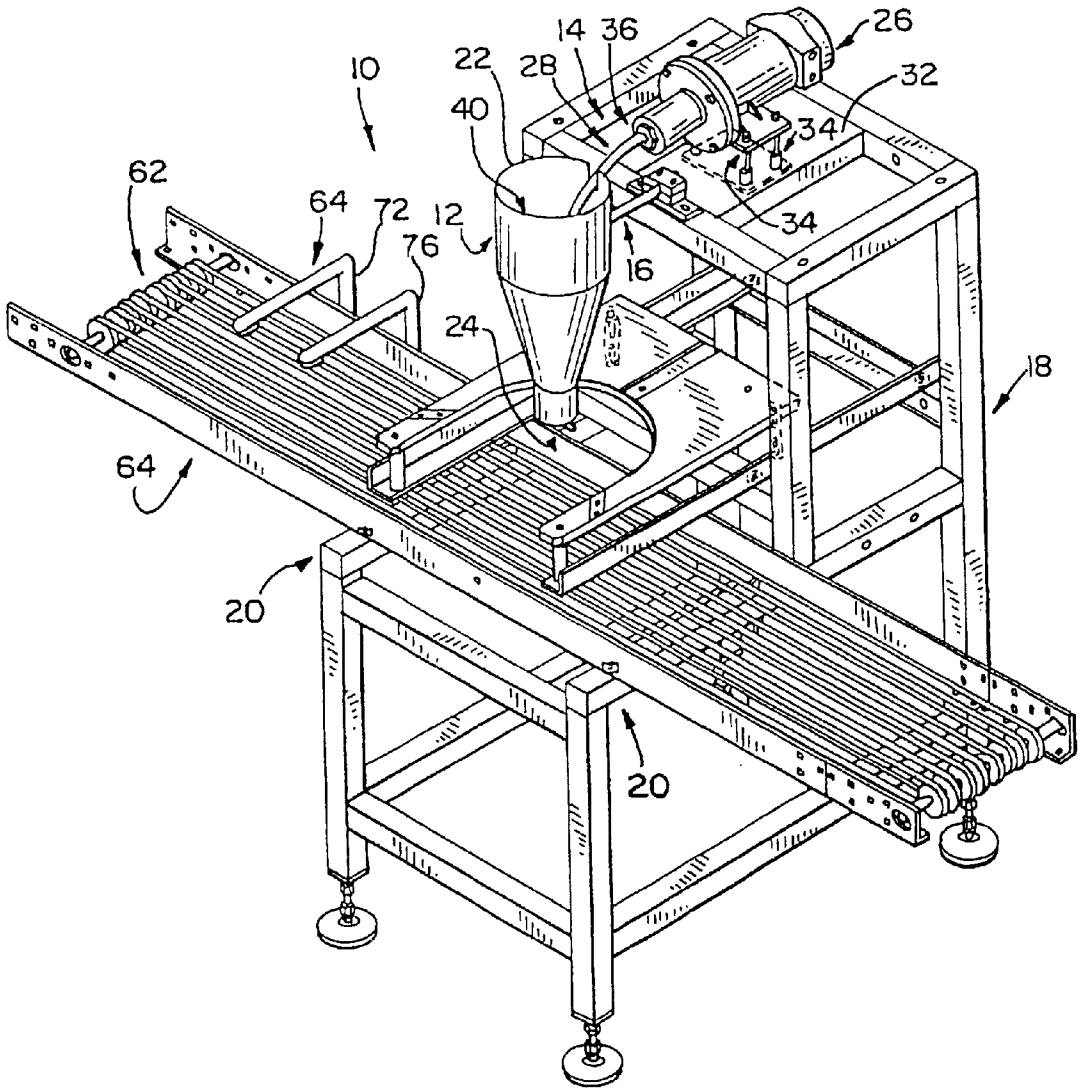
FIG. 1 is a perspective view of an *embodiment of* apparatus for dispensing a quantity of material [on] *upon* a shell *or like target food, the mask member and some other parts being removed*.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIG. 1 is a perspective view of a food material dispensing apparatus 10 of the present invention. The food material dispensing apparatus dispenses a food material to a plurality of *sequenced* target locations. The target locations can *each* be a target food of a type that requires additional toppings. In the preferred embodiment, the target foods are pizza shells or crusts used in the frozen pizza field and the food material is a cheese topping. The dispensing apparatus [comprises] *includes* a hopper 12 and a food distributing system 14.

In the preferred embodiment shown in [FIG. 4] *FIGS. 3, 4 and 5*, the food material dispensing apparatus 10 delivers food material to a *sequenced* plurality of continuously moving food targets. The food material dispensing apparatus 10 of [FIG. 3] *FIGS. 3, 4 and 5* comprises a plurality of hoppers 12. In this preferred embodiment, there are first and second hoppers 12, 12a. The first and second hoppers 12, 12a are linearly aligned.

The first and second hoppers 12, 12a are substantially identical. Each hopper 12 is supported by a beam member 16 within a frame 18 so that the hoppers 12, 12a are suspended and vertically displaced above supporting portions 20 of the frame 18. The hoppers 12, 12a have inlets 22, 22a for accepting a predetermined amount of topping and outlets 24,24a through which the topping passes toward the target location. The inlets 22, 22a have a larger cross-sectional area than that of the outlets 24, 24a so that the hoppers 12, 12a have a funnel-like shape for directing the topping to a concentrated area.

Figure 6:
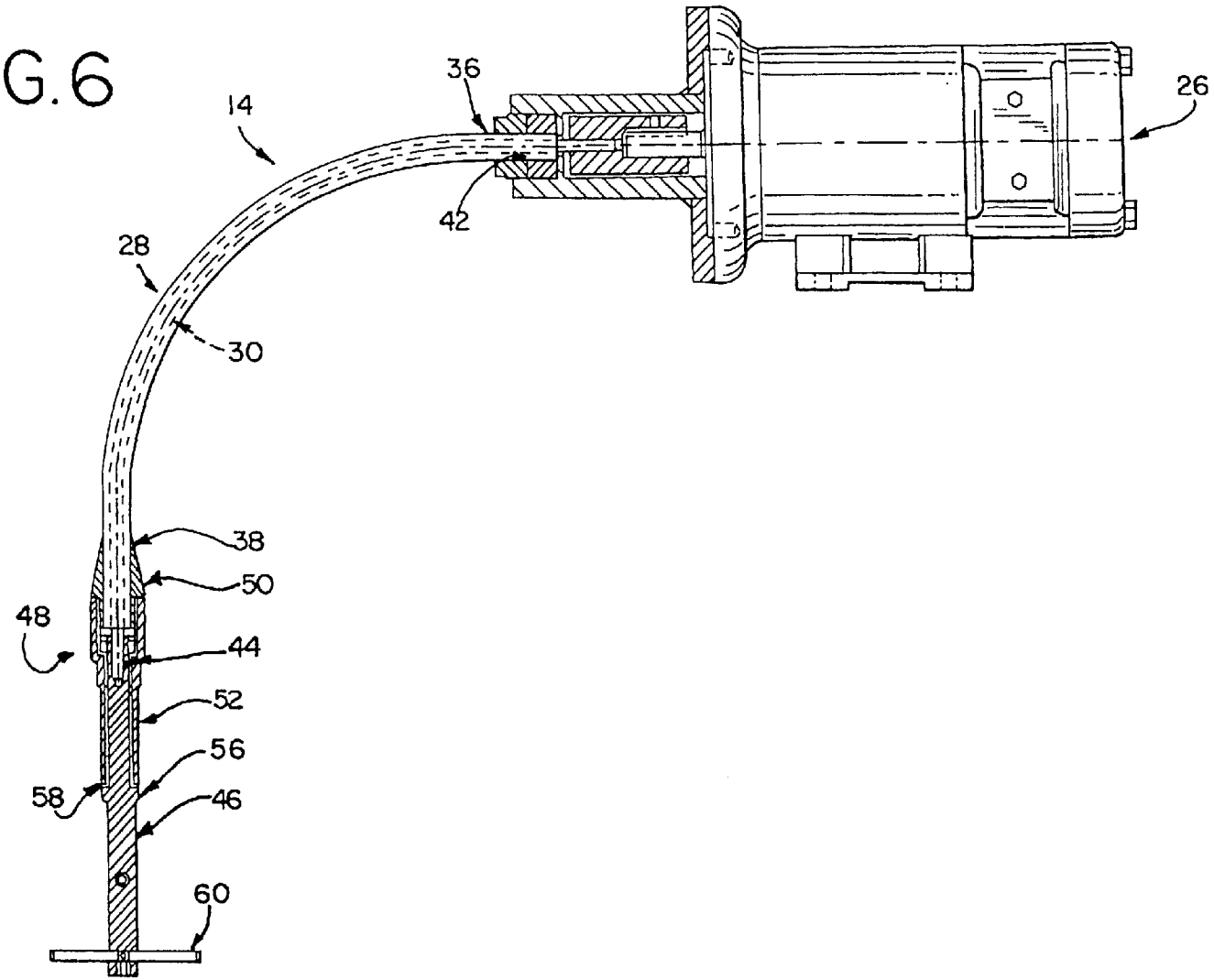
FIG. 6 is a side *elevational* view of [a] *the* food distributing system *employed in the apparatus embodiments of FIGS. 1 and 2 and of FIGS. 3–5, some parts thereof being shown in section and some parts thereof being shown in phantom.*

Each hopper 12 is *illustratively shown* equipped with a food distributing system 14. Referring to FIG. 6, the food distributing systems 14 *each* comprise a motor 26, a curved conduit 28, and a flexible, rotary shaft 30. The motors 26 are positioned at approximately the same height as the inlet 22 of each hopper 12. Rather than being positioned directly above the hoppers 12, the motors 26 are displaced at a horizontal distance from the inlets 22 of the hoppers 12. Each motor 26 is supported on the frame 18 by a platform 32 to which the motors 26 are fixedly attached by a plurality of bolts 34 or other suitable attaching means. (See FIG. 3).

Each curved conduit 28 is attached to one of the motors 26. The curved conduits 28 are preferably produced from stainless steel tubing. A proximal end 36 of each curved conduit 28 is attached to the motor 26. A distal end 38 of each curved conduit 28 is inserted into the hopper 12. Thus, the curved conduits 28 extend from the motors 26 to the inlets 22, enter an interior portion 40 of the hoppers 12, and extend downwardly toward the hopper outlets 24. At the proximal ends 36, the curved conduits 28 are designed to be detachable from the motors 26 for easy cleaning and maintenance.

The flexible, rotary shafts 30 *each* extend from [the] *a* motor 26 through [the] *a* curved conduit 28 into [the] *a* hopper[s] 12. The flexible, rotary shafts 30 are operatively connected at first ends 42 to the motors 26. Second ends 44 of the flexible, rotary shafts 30 are positioned substantially adjacent the distal ends 38 of the curved conduits 28. First and second stirring shafts 46 are operatively connected to *each of* the second ends 44 of the *respective* flexible, rotary shafts 30. The stirring shafts 46 are produced from a rigid material and adapted for stirring and/or mixing the food material.

Collars 48 are fitted around the distal ends 38 of the curved conduits 28 for preventing the food material from entering the curved conduits 28. Each collar 48 has first and second interlocking parts 50, 52. The first part 50 engages the curved conduit 28. The second part 52 extends down [the] *a* length of the stirring shaft 46 and engages an abutment 56 on the stirring shaft 46 to form a seal 58 which prevents the food material from entering the curved conduit 28.

First and second distributing blades 60 *illustratively* are operatively connected to the first and second stirring shafts 46, respectively. [The motors] *Each blade 60 is located below and adjacent to a different one of outlets 24, 24a and the blades 60 are rotatably driven. Hence, each motor* 26 [turn the] *turns a different subassembly of* flexible, rotary [shafts] *shaft* 30, [the] stirring [shafts] *shaft* 46, and [the] distributing [blades] *blade* 60 [cooperating] *cooperatively* to mix the food material *issuing from the outlets 24, 24a* and evenly distribute a predetermined amount of the food material over the target locations.

In one embodiment the target locations, are top portions of the food targets. This embodiment is illustrated in [FIG. 1] *FIGS. 1 and 2*. In [FIG. 1] *FIGS. 1 and 2*, a conveyor belt 62 *with an associated conventional power head* (*not shown*) transports the target foods under the hopper 12. The conveyor belt 62 passes over the supporting portions 20 of the frame 18 and [are] *is* routed through this region by angle iron guides 64 which are fastened to the supporting portions 20 of the frame 18. In operation, the conveyor belt 62 of this embodiment comes to a stop under the hopper 12 where the food material is distributed over the top of the target food by the food distributing system 14.

*Although removed from the apparatus 10 views shown in FIGS. 1 and 3 for purposes of showing apparatus 10 details more fully, a mask member 54 is shown in place in FIG. 2 and in FIGS. 4 and 5. The mask member 54 is located in circumferentially outwardly and horizontally spaced relationship about the outlet 24 of each hopper 12, and also in vertically spaced relationship to either the conveyor belt 62 in the apparatus 10 of FIGS. 1 and 2, or to the transfer belts 66 and 66a in the apparatus 10 of FIGS. 3, 4 and 5, as the case may be. As those skilled in the art will appreciate, a mask member 54 functions to define the perimeter within which food material that exits an outlet 24, and that is distributed by passage through the associated rotating distributing blade 60, is dispensed, and the configuration of a mask member 54 may be selected so that a mask member 54 defines a desired area over which food material is distributed upon a target food.*

As illustrated in [FIG. 4] *FIGS. 3, 4 and 5*, in the preferred embodiment, the food material dispensing apparatus 10 further comprises a plurality of transfer belts 66. Most preferably, there are first and second transfer belts 66, 66a. *Each transfer belt 66, 66a is associated with a separate electric motor 67, 67a for advancing the respective associated transfer belt 66, 66a in a stop-and-go manner.* The transfer belts 66, 66a operate as the target locations for receiving the food material from the first and second hoppers 12, 12a. Accordingly, the transfer belts 66, 66a are positioned below the outlets 24, 24a of the hoppers 12, 12a. The transfer belts 66, 66a have a shorter length than the *conventionally powered* (*powerhead not shown*) conveyor belt 62.

In operation, the first hopper 12 delivers the predetermined amount of food material to the first transfer belt 66. The first transfer belt 66 is stationary as it receives food material from the first hopper 12. The first transfer belt 66 then begins to traverse in the same direction as the conveyor belt 62. The first transfer belt 66 carries the food material toward a first delivery end 68. The speed of the first transfer belt 66 is synchronized with the speed of the conveyor belt 62. As the food material reaches the first delivery end 68, *the food material on the advancing transfer belt 66 is in vertical alignment with a particular food target on the advancing conveyor belt 62, and, as the synchronized speed of the transfer belt 66 continues,* the food material is gravitationally delivered to the target food positioned on the conveyor belt 62 below. The first and second hoppers 12, 12a act in conjunction with the first and second transfer belts 66 to delivery food material *successively* to *each of* a plurality of continuously moving target foods. In other words, as the separate target foods enter the apparatus 10 the first separate target food receives food material from the first transfer belt 66 and the second separate target food receives food material from the second transfer belt 66a, and, although the transfer belts 66, 66a stop to receive food material from the hoppers 12, 12a, the conveyor belt 62 does not need to stop.

The food dispensing apparatus 10 further comprises a means for determining the location of the target food on the conveyor belt 62 and a means for synchronizing the relative positions of the hopper 12 and the target location so that the food material is delivered in an accurate and precise manner to the target food. It is contemplated that a first photoeye 72 is used to determine the actual size of the target food. The information gathered by the first photoeye 72 is communicated to a controller. A second photoeye 76 senses the leading edge of *each* target food, so that the controller, using the size information from the first photoeye, can regulate how far the conveyor belt 62 needs to traverse to place the target food directly under the outlet 24 of the hopper 12, *as in the apparatus of FIGS. 1 and 2.*

In the preferred embodiment, the second photoeye 76 senses the leading edge of [the] *each* target food. The controller, using the size information from the first photoeye 72, *and the location information from the second photoeye 76,* can synchronize the speed of one of the transfer belts 66, 66a with the speed of conveyor belt 62, so that the food material *on each transfer belt* is delivered approximately to the [center] *central area* of the target food *when the food material is gravitationally delivered to the target food from such transfer belt.*

While specific embodiments have been illustrated and described, numerous modifications are possible without departing from the spirit of the invention, and the scope of protection is only limited by the scope of the accompanying claims.

What is claimed is:

1. A food material dispensing apparatus for adding a [topping] *food material* to a target food, comprising:

a first hopper for receiving the food material at an inlet and delivering the food material through an outlet toward a target *food* location; and a first food distributing system for spreading the food material over the target food *at the target food location*, the food distributing system including a motor positioned a horizontal distance from the inlet of the first hopper, a curved conduit having a proximal end and a distal end, the proximal end releaseably connected to the motor and the distal end for insertion into the hopper, [and]

a flexible, rotary shaft [for stirring the food material, the flexible, rotary shaft] passing through the curved conduit and operatively connected at a first *rotary shaft* end *thereof* to the motor, *and*

*a rotatable distributing blade for evenly distributing the food material so delivered from the outlet, the distributing blade being operatively connected to a second rotary shaft end.*

2. The food material dispensing apparatus of claim 1 wherein the first food distributing *system* includes a stirring shaft operatively connected to a second end of the flexible, rotary shaft.

3. The food material dispensing apparatus of claim 2 wherein a collar is fitted around the distal end of the curved conduit for preventing the food material from entering the conduit.

4. The food material dispensing apparatus of claim 3 wherein the collar comprises interlocking first and second parts, the second part extending down a length of the stirring shaft and in communication with an abutment on the stirring shaft.

[5. The food material dispensing apparatus of claim 4 wherein a distributing blade for evenly spreading the food material over the target location is operatively connected to the stirring shaft.]

6. The food material dispensing apparatus of claim 1 further comprising a conveyor belt for transporting *in a sequence a plurality of* the target [food] *foods* toward the first hopper *for passage beneath the first hopper outlet and over the target food location, the conveyor belt including means for advancing the conveyor belt in a stop and go manner.*

7. The food material dispensing apparatus of claim 1

*wherein a conveyor belt, including means for continuously advancing the conveyor belt, is positioned under the outlet and over the target food location and whereon a plurality of target foods is sequentially arranged,*

*wherein a mask member is located in circumferentially spaced relationship about the outlet for conforming so delivered and distributed food material,* wherein [the target location is] a transfer belt of shorter length than the conveyor belt [and] *is* positioned *beneath the mask member, and between and* in vertical alignment with the conveyor belt *and also the first hopper outlet, and the transfer belt includes stop-and-go drive means, and* wherein the food material *so delivered by the hopper and distributed by the distributing blade within the mask member* is deposited on the transfer belt *while stationary after which the transfer belt advances and* [which] delivers the food material *thereon* to [the] *an individual* target food *of the plurality of target foods* located *and advancing* on the conveyor belt.

8. The food material dispensing apparatus of claim 1 further comprising a second hopper and a second food distributing system.

9. The food material dispensing apparatus of claim [1] *7* further comprising means for determining the location of [the] *each succeeding* target food *of the target food plurality on the conveyor belt* and means for synchronizing the relative positions of [the hopper and the target location wherein] *each location-identified succeeding target food on the advancing conveyor belt with the food material so deposited on the advancing transfer belt whereby* the food material is delivered in an accurate and precise manner to [the] *each* target food.

10. The food material dispensing apparatus of claim 9 wherein the means for determining the location of [the] *each succeeding* target food on the conveyor belt is a photoeye.

11. A continuous food material dispensing apparatus for adding a [topping] *food material* to *each one of* a plurality of *similarly sized* target foods[,] *sequentially arranged on a continuously advancing conveyor belt, the apparatus* comprising:

a first and *a* second hopper, each hopper for receiving the food material in an inlet and *for* delivering the food material through an outlet toward a plurality of target [locations] *foods that progressively advance generally beneath the outlets of the first and the second hoppers*; and a first and a second curved conduit, each conduit having a proximal end and a distal end, the proximal ends releaseably connected to *each of* first and second motors, respectively, and the distal ends for insertion into *each of* the first and *the* second hoppers, respectively, and a first flexible, rotary shaft and a second flexible, rotary shaft [for stirring the food material], the flexible, rotary shafts passing through *each of* the first and *the* second conduits, respectively, and *being* operatively connected at *each* first [ends] *end thereof* to *each of* the *first and the second* motors, *respectively*.

12. The food material dispensing apparatus of claim 11 wherein first and second stirring shafts [for mixing the food material] are *each* operatively connected to a second end of *each of* the first and *the* second flexible, rotary shafts, respectively.

13. The food material dispensing apparatus of claim 12 wherein *a* first and *a* second distributing [blades] *blade is located adjacent to the outlet of each of the first and the second hoppers, respectively*, for evenly distributing the food material [over the target locations are] *so delivered from each outlet* connected to the *first and the second* stirring shafts, *respectively*.

14. The food material dispensing apparatus of claim 13 wherein first and second collars for preventing the food material from entering the first and *the* second conduits, *respectively,* are fitted around the distal ends of *each of* the first and *the* second conduits, *respectively*.

15. The food material dispensing apparatus of claim 14 wherein the first and *the* second collars *each* comprise interlocking first and second parts, [the] *each* second [parts] *part* extending down *a portion of* the length of the first and *the* second stirring shafts, *respectively,* and *being* in communication with an abutment on *each of the first and* the *second* stirring shafts, *respectively*.

16. The food material dispensing apparatus of claim 13 further comprising a conveyor belt *located beneath the outlets of the first and the second hoppers and with which the outlets of the first and the second hoppers are vertically and longitudinally aligned relative to the direction of conveyor belt advance, including means for continuously advancing the conveyor belt, and on which the plurality of target foods is sequentially arranged,* for transporting the target foods toward the first and *the* second hoppers *and successively beneath the first and the second hopper outlets, respectively*.

17. The food material dispensing apparatus of claim 16

*wherein a first and a second shroud is located in circumferentially spaced relationship about each of the first and the second outlets, respectively,* wherein [the target locations are located atop] *a* first and *a* second transfer [belts] *belt is* positioned *beneath the first and the second mask members, respectively, and is* in vertical alignment with *and is located between* the *underlying* conveyor belt *and the overlying outlets of the first and the second hoppers, respectively, and each of the first and the second transfer belts has first and second stop-and-go drive means, respectively, and* wherein the food material is deposited [on the] *from the outlet of each of the first and the second hoppers through the first and the second distributing blades, respectively, and through the first and the second mask members, respectively, onto each of the first and the second* transfer belts [which deliver] *, respectively, while each of the first and the second transfer belts is stationary after which each of the transfer belts advances and delivers* the food material [to] *thereon to respective individual succeeding target foods of* the plurality of target foods *located on the continuously advancing conveyor belt*.

18. The food material dispensing apparatus of claim [11] *17* further comprising

*photoeye* means for determining the location of [the] *each succeeding* target food *of the plurality of target foods advancing on the conveyor belt in relation to the first and the second transfer belts, said photoeye means being located in a fixed position over the conveyor belt and before the outlet of the first hopper relative to the direction of advance of the conveyor belt,* and

*control* means *cooperative with the photoeye means for sequentially, selectively and cyclically advancing each one of the first and the second transfer belts, and* for synchronizing the relative positions [of the hopper and the target location] *of each so advancing one of the first and the second transfer belts with each so-location determined, succeeding target food on the continuously advancing conveyor belt,*

[wherein] *whereby* the food material *so deposited on each transfer belt* is delivered in an accurate and precise manner to *each succeeding one of* the target [food] *foods advancing on the conveyor belt*.

19. The food material dispensing apparatus of claim 18 wherein the means for determining the location of *each succeeding* the target food on the conveyor belt is a photoeye.

20. A continuous food material dispensing apparatus for adding a [topping] *food material* to *each one of* a plurality of target foods *of predetermined uniform individual size*, comprising:

a first and a second hopper, each hopper for receiving the food material at an inlet and *for gravitationally* delivering a predetermined amount of the food material through an outlet [toward a plurality of target locations of predetermined size];

a first and a second motor, each motor positioned at a distance from the first and second hoppers*respectively*;

a first and a second curved conduit, each conduit having a proximal end and a distal end, the proximal ends *each being* releaseably connected to the first and second motors, *respectively,* and *each of* the distal ends for insertion into the first and *the* second hoppers, respectively, and a first and a second flexible, rotary shaft [for stirring the food material], *each of* the flexible, rotary shafts passing through the first and second conduits, respectively, and operatively connected at *respective flexible, rotary shaft* first ends to *each of* the first and *the* second motors, respectively;

a first and a second stirring shaft [for mixing the food material], each stirring shaft operatively connected to a second end of each *respective* flexible, rotary shaft;

a first distributing blade and a second distributing blade for evenly distributing the predetermined amount of food material [over the food targets connected to the first and second stirring shafts, respectively] *so delivered from the outlet of each of the first and the second hoppers, respectively;*

*a first and a second mask member, each mask member located in circumferentially spaced relationship to the*

*outlet of each of the first and the second hoppers, respectively, and each mask member being similarly configured relative to the other, so that the mask members conform to the size of the individual target foods of the plurality of target foods;* a conveyor belt [for transporting the target foods toward the first and second hoppers] *that extends beneath the outlets of the first and the second hoppers and also beneath the first and the second mask members, respectively, that is vertically and longitudinally aligned relative to the direction of conveyor belt advance with the first and the second hoppers, respectively, that include means for continuously and uniformly advancing the conveyor belt, and that on which the plurality of target foods is sequentially arranged for transporting the target foods toward the first and the second hoppers and successively beneath the outlets of the first and the second hopper outlets, respectively*;

[means for predetermining the size of each target food positioned on the conveyor belt;]

[means for predetermining the amount of food material needed to cover each food target in communication with the means for predetermining the size of the target food; and]

a first transfer belt and a second transfer belt[,] *that are each of shorter length than the conveyor belt, that are* each [transfer belt] positioned in vertical alignment with *and between* the conveyor belt [wherein the predetermined amount of food material is deposited from the hoppers onto the transfer belts which continuously deliver the food material to the plurality of target foods located on the conveyor belt.] *and the outlet of a different one of each of the first and the second hoppers, respectively, and that are each provided with a first and a second stop and go drive means, respectively, so that the predetermined amount of the food material so delivered from the outlet of each of the first and the second hoppers is deposited onto the first and the second transfer belts, respectively, while stationary, after which the transfer belts each advance in the direction of advance of the conveyor belt and deliver the food material thereon to individual target foods of the plurality of target foods located on the conveyor belt;*

*photoeye means for determining the location of each succeeding target food of the plurality of target foods advancing on the conveyor belt in relation to the first and the second transfer belts, said photoeye means being located in a fixed position over the conveyor belt and before the outlet of the first hopper relative to the direction of advance of the conveyor belt; and*

*control means cooperative with the photoeye means for sequentially, selectively and cyclically advancing each one of the first and the second transfer belts, and for synchronizing the relative positions of each so advancing one of the first and the second transfer belts with the position of each so-location determined, succeeding target food on the continuously advancing conveyor belt;*

*whereby the food material so deposited on each transfer belt is sequentially delivered in an accurate and precise manner to each succeeding one of the target foods advancing on the conveyor belt.*

*21. A continuous food material dispensing system for adding a food material to each one of a plurality of similar target foods comprising:*

*(a) a conveyor belt for continuously transporting said plurality of target foods sequentially, including means for continuously advancing the conveyor belt;*

*(b) a hopper that is vertically located over said conveyor belt, said hopper having an upper inlet for receiving and a lower outlet that is smaller than the upper outlet for delivering a predetermined amount of food material charged to said hopper;*

*(c) a plurality of distributing blades positioned adjacent to said outlet, including means for rotating said distributing blades, for evenly distributing food material so delivered from said outlet;*

*(d) a mask member located in circumferentially spaced relationship about said outlet, said mask member for defining the area in which food material so delivered from said outlet is evenly distributed;*

*(e) a transfer belt of substantially shorter length than said conveyor belt positioned between and in vertical alignment with said conveyor belt and with said outlet, and having a stop and go drive means, for receiving while stationary food material so delivered from said outlet, and thereafter for advancing in the direction of advance of said conveyor belt to deliver so received food material thereon from a forward edge region thereof upon a succeeding target food of said target food plurality on said conveyor belt that is vertically aligned with said forward end region and that is so advancing on said conveyor belt;*

*(f) photoeye means located in a fixed position over said conveyor belt and upstream from said transfer belt for determining the leading edge location of each succeeding target food of said plurality of target foods so advancing on said conveyor belt; and*

*(g) control means cooperative with both said transfer belt and also with said photoeye means, for synchronizing the advance of said transfer belt with the advance of each said so photoeye location determined succeeding target food advancing on said conveyor belt until said food material is transferred from said advancing transfer belt to said succeeding target food;*

*whereby food material so received on said transfer belt is so delivered to each succeeding one of said plurality of target foods so advancing on said conveyor belt.*

*22. A continuous food material dispensing system for adding a food material to each one of a plurality of similar target foods comprising:*

*(a) a conveyor belt for continuously transporting said plurality of target foods sequentially including means for continuously advancing the conveyor belt;*

*(b) a plurality of hoppers that are vertically located over and are longitudinally aligned relative to each other and relative to the direction of advance of said conveyor belt, each hopper having an upper inlet for receiving and a lower outlet that is smaller than the upper outlet for delivering a predetermined amount of food material charged to each said hopper;*

*(c) a plurality of distributing blades, each one positioned adjacent to a different outlet of each one of said hoppers, including means for rotating each said distributing blade, each distributing blade for evenly distributing food material so delivered from each said hopper;*

*(d) a plurality of similarly configured mask members, each mask member being located in circumferentially spaced relationship about a different outlet of each one*

*of said hoppers, each mask member for defining the area in which food material is so delivered is evenly distributed;*

(*e*) *a plurality of transfer belts, each one of substantially shorter length than said conveyor belt, each one positioned between and in vertical alignment with said conveyor belt and with a different one of said hoppers, each one having a stop-and-go drive means, and each one for receiving while stationary food material so delivered and so distributed from the vertically adjacent one of said hoppers, and thereafter for advancing in the direction of advance of said conveyor belt to deliver so received food material thereon from a forward edge region thereof upon a succeeding target food of said target food plurality that is vertically aligned therewith and that is so advancing on said conveyor belt;*

(*f*) *photoeye means located in a fixed position over said conveyor belt and upstream from said transfer belts for determining the leading edge location of each succeeding target food of said plurality of target foods so advancing on said conveyor belt; and*

(*g*) *control means cooperative with said photoeye means, for sequentially, selectively and cyclically advancing each one of said transfer belts of said transfer belt plurality, and for synchronizing the advance of each advancing one of said transfer belts with the advance of each said so photoeye location determined succeeding target food advancing on said conveyor belt until said food material is transferred from said advancing transfer belt to said succeeding target food;*

*whereby food material so received on each said transfer belt is so delivered to each succeeding one of said plurality of target foods so advancing on said conveyor belt.*

*23. The food material dispensing system of claim 21 wherein said plurality of hoppers comprises two hoppers, said plurality of distributing blades comprises two distributing blades, said plurality of mask members comprises two mask members, and said plurality of transfer belts comprises two transfer belts.*

*24. A method for dispensing food material upon individual target foods that are sequentially arranged on a conveyor belt that continuously advances along an elongated, generally horizontal first pathway, said method comprising the succeeding steps of:*

(*a*) *locating a plurality of hoppers vertically over and in longitudinal alignment relative to each other and relative to the direction of advance of said conveyor belt, each hopper having an upper inlet for receiving and having a lower outlet that is smaller than the upper outlet and delivering, a predetermined amount of food material charged to each hopper;*

(*b*) *positioning a plurality of distributing blades, each blade being adjacent a different outlet of each one of said hoppers, and rotating each said distributing blade, and evenly distributing food material so delivered from each said hopper;*

(*c*) *establishing a plurality of similarly configured mask members, each mask member being set in circumferentially spaced relationship about a different outlet of each one of said hoppers, and defining the area in which food material is so delivered is evenly distributed;*

(*d*) *arranging a plurality of transfer belts, each transfer belt being of substantially shorter length than said conveyor belt, each transfer belt being positioned between and in vertical alignment with said conveyor belt and with a different one of said hoppers, and providing stop and go advancing means for each transfer belt, and each transfer belt receiving while stationary food material so delivered and so distributed from the vertically adjacent one of said hoppers, and thereafter advancing in the direction of advance of said conveyor belt to deliver so received food material thereon from a forward edge region thereof upon a succeeding target food of said target food plurality advancing on said conveyor belt while said succeeding target food is vertically aligned therewith;*

(*e*) *locating a photoeye in a fixed position over said conveyor belt and upstream from said transfer belts and determining the leading edge location of each succeeding target food of said plurality of target foods so advancing on said conveyor belt; and*

(*f*) *interconnecting said photoeye, and sequentially, selectively and cyclically advancing each one of said transfer belts of said transfer belt plurality, and synchronizing the advance of each so advancing one of said transfer belts with the advance of each said so photoeye-location determined succeeding target food advancing on said conveyor belt until said food material is transferred from said advancing transfer belt to said succeeding target food;*

*whereby food material so received on each said transfer belt is so delivered to each succeeding one of said plurality of target foods so advancing on said conveyor belt.*

*25. The method of claim 24 wherein each one of said pluralities of hoppers, of distributing blades, of mask members, and of transfer belts, respectively, comprises two members.*

* * * * *